(12) United States Patent
Lin (10) Patent No.: US 8,979,697 B2
(45) Date of Patent: Mar. 17, 2015

(54) LARGE-RATIO SPEED CHANGING APPARATUS

(76) Inventor: Panchien Lin, Chunglin (TW)

( * ) Notice: Subject to any disclaimer, the term of this patent is extended or adjusted under 35 U.S.C. 154(b) by 376 days.

(21) Appl. No.: 13/289,477

(22) Filed: Nov. 4, 2011

(65) Prior Publication Data

US 2012/0115666 A1    May 10, 2012

Related U.S. Application Data

(60) Provisional application No. 61/410,245, filed on Nov. 4, 2010.

(51) Int. Cl.
*F16H 1/32*    (2006.01)

(52) U.S. Cl.
CPC ............ *F16H 1/32* (2013.01); *F16H 2001/324* (2013.01)
USPC ....................................... 475/162

(58) Field of Classification Search
USPC ........................ 475/162, 163, 178, 179, 180
See application file for complete search history.

(56) References Cited

U.S. PATENT DOCUMENTS

| | | | | |
|---|---|---|---|---|
| 1,942,794 A | * | 1/1934 | Benson | 475/162 |
| 1,942,795 A | * | 1/1934 | Benson | 475/178 |
| 4,512,213 A | * | 4/1985 | Newton | 475/179 |
| 8,152,676 B2 | * | 4/2012 | Kobayashi et al. | 475/162 |
| 2010/0066039 A1 | * | 3/2010 | Koch et al. | 280/5.52 |

* cited by examiner

*Primary Examiner* — Robert A Siconolfi
*Assistant Examiner* — Huan Le
(74) *Attorney, Agent, or Firm* — Allen, Dyer, Doppelt, Milbrath & Gilchrist, P.A.

(57) ABSTRACT

A speed changing apparatus for changing an input speed to an output either greatly slower or faster, the apparatus has a coaxial pair of ring gears that includes a large ring gear having a pitch diameter A and a small ring gear having a pitch diameter D. A coaxial pair of spur gears includes a large spur gear having a pitch diameter B and a small spur gear having a pitch diameter C. The large spur gear meshes with the large ring gear and the small spur gear meshes with the small ring. A carrier member is connected to one of the input and output shafts of the apparatus. Two gears of one of the two coaxial pairs being fixed together to operate epicyclically on the carrier. One gear of the other of the two coaxial pairs being fixed to the frame of the apparatus and the other gear being connected to the other of the input and output shafts. In the apparatus, the four gears satisfy the dimensional relationship of $A=K+i$, $B=K$, $C=K-j$ and $D=K+i-j$.

17 Claims, 6 Drawing Sheets

LARGE-RATIO SPEED CHANGING APPARATUS

CROSS-REFERENCE TO RELATED APPLICATIONS

This application claims benefit of provisional application Ser. No. 61/410,245, filed Nov. 4, 2010, the disclosure which is hereby incorporated by reference in its entirety.

FIELD OF THE INVENTION

The present invention relates in general to speed changing apparatus and, in particular, to large-ratio speed changing apparatus. More particularly, the present invention relates to a large-ratio speed changing gear train apparatus for both speed reduction and speed increase applications.

BACKGROUND OF THE INVENTION

Speed changing is indispensable. Frequently a prime mover must work at high rotational speeds for optimized efficiency while the load it drives must run at tenths or even hundredths its speed. One way to obtain such large speed reduction ratio is to use a cascade of reducers of smaller ratio but at best efficiency.

However, this cascaded speed reduction suffers poor overall speed-changing efficiency due to its nature of having the entire load passing successively through each and every reducer stage of the cascade. The arrangement is also bulky for the obvious reason that each stage in the cascade must be fully rated to handle one hundred percent of the total power delivered by the prime mover.

One type of "single-stage" reducers currently used widely is the cycloidal drive manufactured by Sumitomo Heavy Industries, Ltd. of Tokyo, Japan. Although relatively compact for speed-changing ratios ranging from tens to more than one hundred, the drive is, essentially, one cycloidal gearing stage followed by an off-axis power extraction stage.

Figure 1:
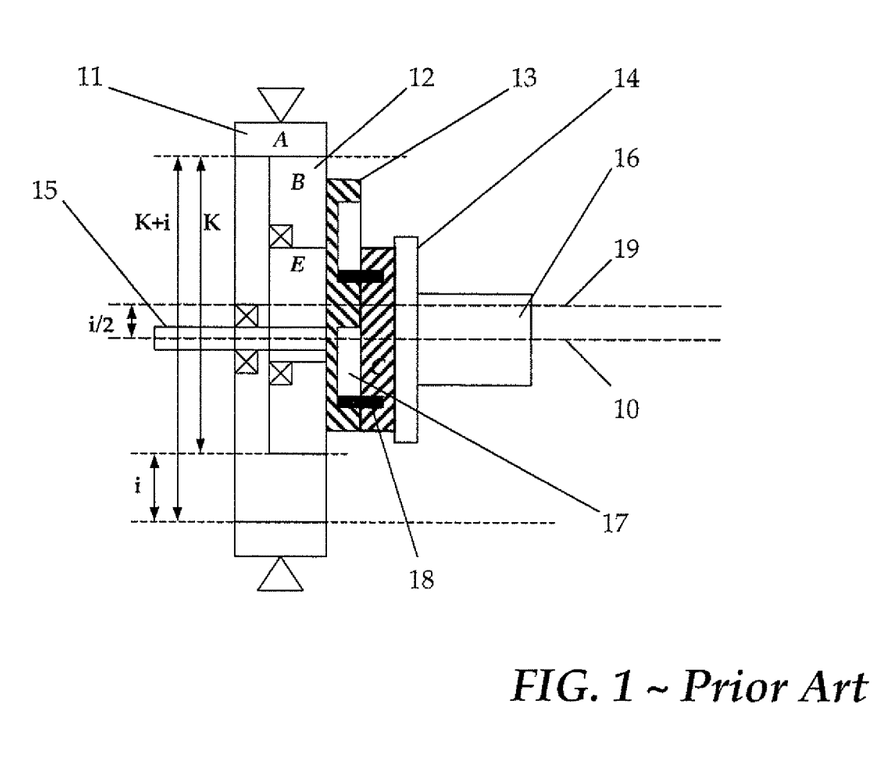
FIG. 1 schematically illustrates a prior art large-ratio cycloidal speed reducer.

FIG. 1 schematically illustrates the configuration of such a cycloidal speed reducer in cross section. The conventional device in FIG. 1 has a fixed ring gear 11 and a shaped planet element 12, sometimes a shaped disc or sometimes simply a gear. The planet element 12 engages with and moves inside the ring gear 11 epicyclically. The two have an as-small-as-possible difference in their working pitch diameters.

For the off-axis power extraction stage, a disc 13 is fixed to the planet element 12 coaxially on their axis 19 and has a number of holes 17 to allow for engagement by a corresponding number of roller pins 18 planted on the plate 14. The plate 14 is coupled to the output shaft 16 of the drive and is centered on the central axis 10 of the device. This "power extraction" arrangement allows the drive to deliver a speed-reduction ratio of $-K/i$, wherein K is the pitch diameter of the planet element 12 and i is the difference between the pitch diameters of elements 11 and 12. In a typical example wherein the ring gear 11 has 80 teeth and a gear version of the planet element 12 has 79 (K=80 mm and i=1 mm using module 1 metric gears), the ratio is $-80$ when mechanical power is transmitted by the device via the input at shaft 15.

Figure 2:
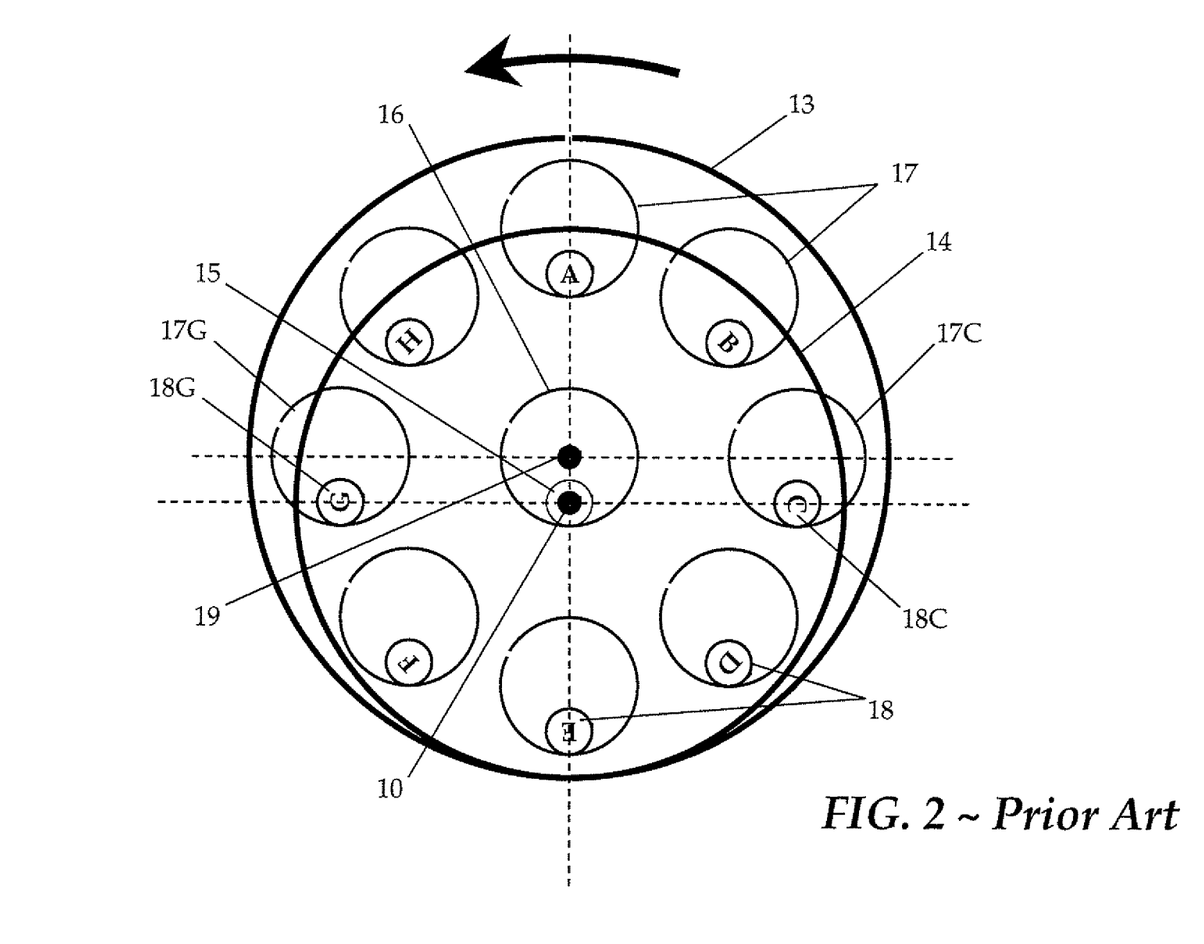
FIG. 2 schematically illustrates the off-axis power extraction coupling used for a prior art cycloidal drive.

FIG. 2 schematically illustrates the off-axis power extraction coupling used for the prior art cycloidal drive of FIG. 1. At any given time, only one of the typically eight or more pin-roller and cycloidal disc hole engagements is transmitting torque fully. For example, with the angular position of the relative offset and with the direction of rotation as shown, only the pair of pin roller 18C and hole 17C is transmitting power fully for the device.

This is obvious as the edge of the hole 17C of the driving disc 13 that is in contact with the pin roller 18C of the driven plate 14 must be behind the roller 18C along the direction of rotation. In this sense pin roller and hole pairs identified by B and D are partially working to transmit power because of the location of their contact points relative to the direction of rotation of the disc 13 and plate 14. In the same sense, the pin-roller and hole pair 18G and 17G is not working at all because the pin roller 18G, the driven, travels behind its contact point with its hole 17G, the driver.

Conventional cycloidal drives rely on a synchronizing engagement between two elements (gears) of different pitch diameter with offset axes. But this is not an optimized mechanism due to low utilization: Of all eight pin/hole pairs shown in FIG. 2, half (four or even five depending on the angular position) of them are not in the position to drive the load. Of the other half, only one can be in a full-effort position to drive the load, the other three are in their partial effort. With limitations such as these, cycloidal drives achieve typically less than 80 percent efficiency under normal load conditions.

Further, to achieve a speed reduction ratio of K, a cycloidal drive requires a fixed ring gear of K+1 teeth. For large ratio, the large ring gear number makes the drive bulky if the rated torque is substantial therefore the teeth must be sufficiently robust—in size. In other words, compactness of the cycloidal drive places a limitation on the torque and power rating of the drive.

Another type of large-ratio reducer widely used in precision and aerospace applications is the harmonic drive manufactured by Harmonic Drive Systems Inc. of Tokyo, Japan. Operating the basic concept known as strain wave gearing, harmonic drive is relatively low in available power rating. The drive also delivers typically less than 60 percent efficiency under normal load because its spline element flexes all the time as the drive operates to transmit mechanical power.

In addition to large-ratio speed reducers there are also the need to increase a slow input speed to an output up to tens or hundreds of times faster.

SUMMARY OF THE INVENTION

It is an object of the present invention to provide an apparatus for large-ratio speed changing using gears with small tooth numbers in the tens to the twenties.

It is also an object of the present invention to provide an apparatus for large-ratio speed changing that is high efficiency as with precision gear meshing.

It is also an object of the present invention to provide an apparatus for large-ratio speed changing that has high power density with small tooth-number gear members that can be constructed with large module number.

In order to achieve the above and other objects, the present invention provides a speed changing apparatus for changing an input speed to an output either greatly slower or faster. The apparatus has a coaxial pair of ring gears that includes a large ring gear having a pitch diameter A and a small ring gear having a pitch diameter D. A coaxial pair of spur gears includes a large spur gear having a pitch diameter B and a small spur gear having a pitch diameter C. The large spur gear meshes with the large ring gear and the small spur gear meshes with the small ring gear. A carrier member is connected to one of the input and output shafts of the apparatus. Two gears of one of the two coaxial pairs being fixed together to operate epicyclically on the carrier. One gear of the other of the two coaxial pairs being fixed to the frame of the apparatus and the other gear being connected to the other of the input and output shafts. In the apparatus, the four gears satisfy the dimensional relationship of $A=K-i$, $B=K$, $C=K-j$ and $D=K+i-j$.

DETAILED DESCRIPTION OF THE PREFERRED EMBODIMENTS

Figure 3:
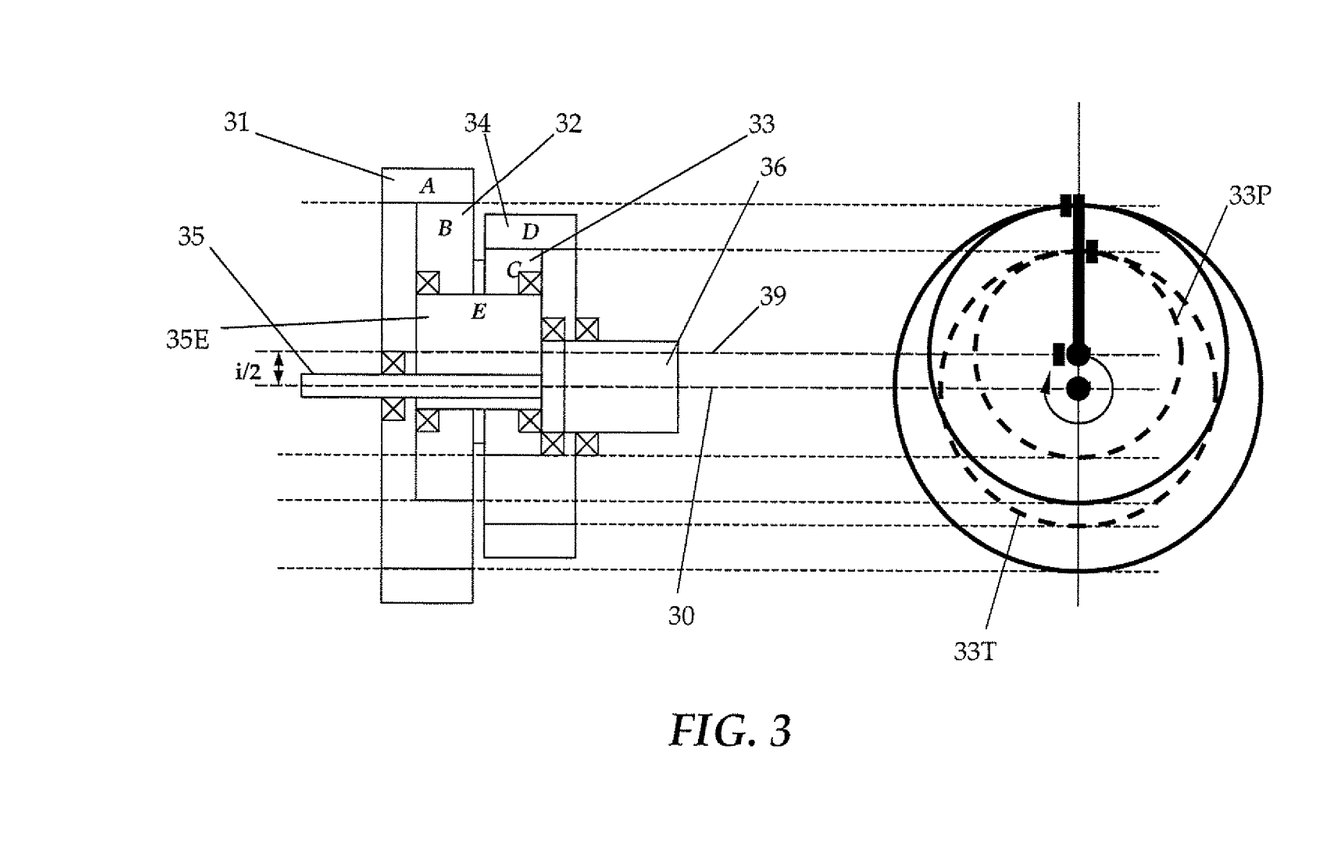
FIG. 3 is a cross-sectional view of a speed changing apparatus of the present invention that schematically illustrates the off-axis power extraction stage thereof.

FIG. 3 is a cross-sectional configuration of a speed changing apparatus of the present invention that schematically illustrates an equivalent arrangement of the off-axis power extraction stage thereof. With simultaneous reference also to FIGS. 1 and 2, instead of the plate 14 with multiple pin-rollers 18 that engages with their corresponding holes 17 formed in the cycloidal disc 13, a speed changing apparatus of the present invention has a different arrangement for power extraction.

As is illustrated, while the planet gear 32 moves epicyclically inside the frame ring gear 31, the planet gear 33 that is fixed coaxially with gear 32 also moves epicyclically inside the ring gear 34 of the second pair of ring-spur gears. As the gear 33 spins and moves epicyclically inside gear 34, its outer most edge (of its pitch circle) 33P plots a trace 33T. This trace 33T is made to exactly coincide with the pitch circle of the ring gear 34. Essentially, ring gear 34 of the second pair, together with its meshing spur gear 33, serves a similar function as the off-axis power extraction means of a conventional cycloidal drive but allows the present inventive apparatus to produce a speed change ratio that is much larger, as is described hereinafter.

Figure 4:
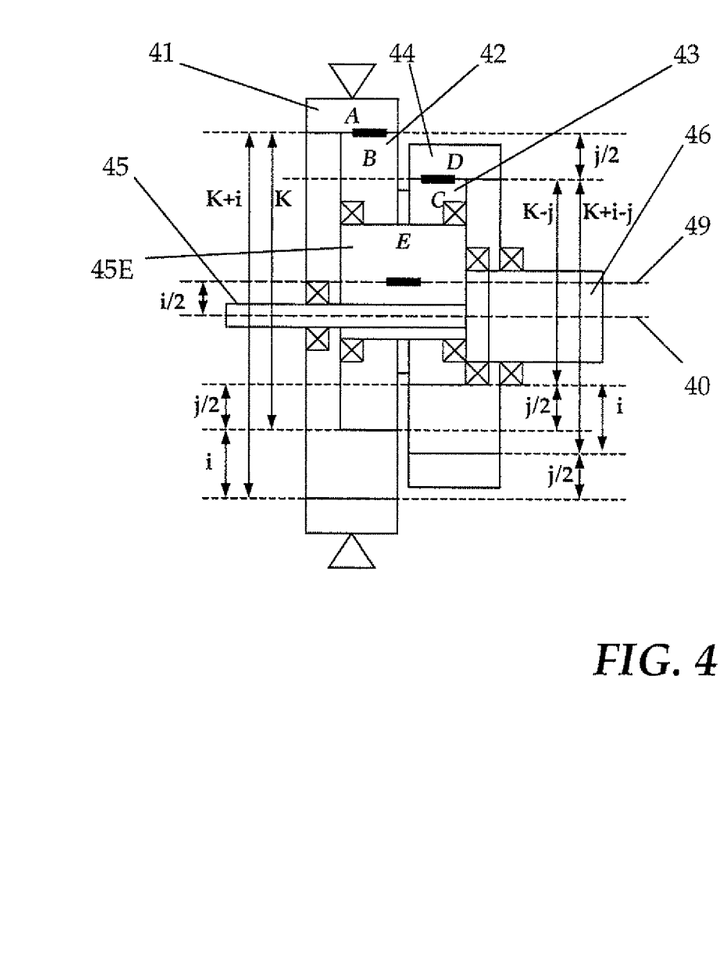
FIG. 4 schematically illustrates a cross-sectional view of a speed changing apparatus of the present invention outlining the dimensional configuration of all members thereof.

FIG. 4 schematically illustrates in a cross-sectional view the configuration of a speed changing apparatus of the present invention outlining the dimensional configuration of all members thereof. The speed changing apparatus has a coaxial pair of ring gears that includes a large ring gear 41 having a pitch diameter A and a small ring gear 44 having a pitch diameter D. The apparatus also has a coaxial pair of spur gears that includes a large spur gear 42 having a pitch diameter B and a small spur gear 43 having a pitch diameter C. The large spur gear 42 meshes with the large ring gear 41 and the small spur gear 43 meshes with the small ring gear 44, forming two meshing pairs. A carrier member 45E is connected to the input shaft 45 of the speed changing apparatus. The carrier member 45E, essentially a "twisted" version of that found in conventional planetary gear trains, is formed by combining the input shaft 45 (on the central axis 40 of the entire system) and the central shaft for the pair of gears 42 and 43 (on its own axis 49).

Further, the two coaxial spur gears 42 and 43 are fixed together to each other to operate epicyclically on the carrier 45E. The large ring gear 41, in this depicted example of FIG. 4, is fixed to the frame of the apparatus serving as the reaction member of the system and the small ring gear 44 is connected to the output shaft 46.

In this gear train system, the four gears 41, 42, 43 and 44 satisfy the dimensional relationship of A=K+i, B=K, C=K−j and D=K+i−j. As will be appreciated, in some embodiments of the speed-changing apparatus of the present invention, the gears must have integer tooth numbers.

Essentially the speed changing apparatus of FIG. 4 has the carrier 45E acting as the input, the small ring gear 44 as the output, and the large ring gear 41 the reaction member. Meanwhile, the two coaxial spur gears 42 and 43 that are fixed together move epicyclically in the system. The illustrated speed changing apparatus of FIG. 4 has a speed change ratio of K(K+i−j)/ij. For a gear-based system with dimensions of A, B, C and D pitch diameters that of 16T (teeth), 15T, 14T and 15T module 10 gears respectively, or, K=150 mm (15 cm), I=10 mm (1 cm) and j=10 mm (1 cm), the speed changing ratio is 225.

By contrast, a conventional cycloidal drive (of FIG. 1) with A pitch diameter that of a 16T gear and B of 15T, the speed-changing ratio is −15. This means a speed changing apparatus of the present invention is able to achieve a ratio that is the square in numerical value that of a cycloidal drive with comparable tooth number.

A speed changing apparatus of the present invention can be used in different configurations of input, output and reaction member assignments among its constituent gear and carrier members. Essentially, a general-purpose speed changing apparatus of the present invention—used either as a speed reducer or an increaser having either a fixed ring gear or a fixed spur gear—can be constructed to have a coaxial pair of ring gears that includes a large ring gear having a pitch diameter A and a small ring gear having a pitch diameter D. Such an apparatus also has a coaxial pair of spur gears that includes a large spur gear having a pitch diameter B and a small spur gear having a pitch diameter C. The large spur gear meshes with the large ring gear and the small spur gear meshes with the small ring gear, forming two meshing pairs. A carrier member is connected to one of the input and output shafts of the apparatus. Two gears of one of the two coaxial pairs are fixed together to operate epicyclically on the carrier. One gear of the other of the two coaxial pairs is fixed to the frame of the apparatus and the other gear is connected to the other of the input and output shafts. In such a system, the four gears satisfy the dimensional relationship of A=K+i, B=K, C=K−j and D=K+i−j.

Figure 5:
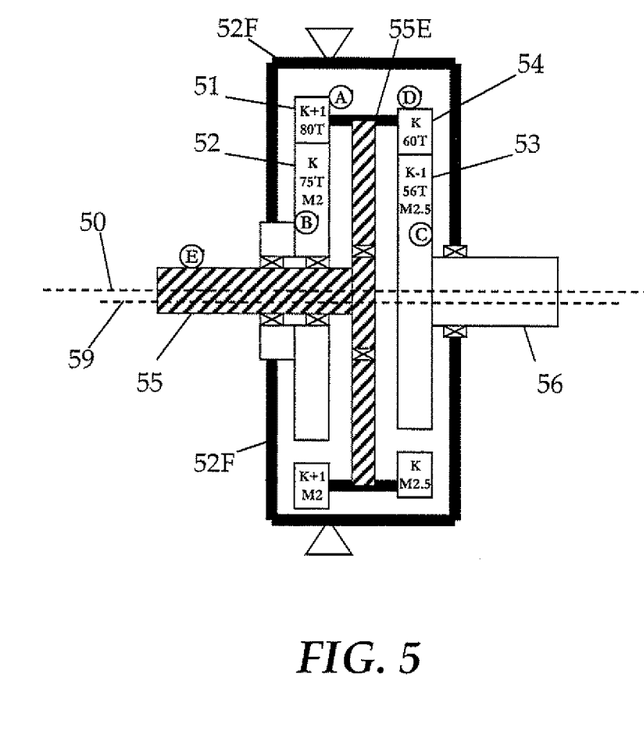
FIGS. 5 and 6 schematically illustrate cross-sectional views of the speed changing apparatus of the present invention in different input- and output-member arrangements.
Figure 6:
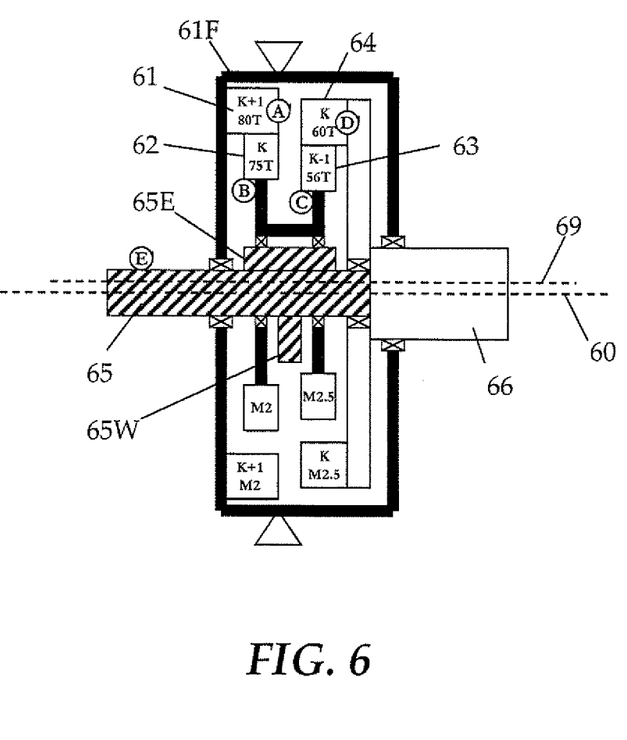

FIGS. 5 and 6 schematically illustrate cross-sectional views of the speed changing apparatus of the present invention that are in different input- and output-member arrangements. The examples of FIGS. 5 and 6 show the construction of reducers with 200-plus speed reduction ratio using two ring-spur gear pairs of different module numbers. The first pair with large ring and spur gears includes an 80-tooth ring gear 51, 61 with a module number of 2 making a pitch diameter of 160 mm and a 75T, M2 spur gear 52, 62 with 150 mm pitch. The second pair of small ring and spur includes a 60T, M2.5 ring gear 54, 64 with 150 mm pitch and a 56T, M2.5 spur 53, 63 with 140 mm pitch. Thus, with the large spur gear fixed to the device frame 52F as the reaction member as is the configuration of FIG. 5, the speed changing apparatus delivers a reduction ratio of −224.

The apparatus of FIG. 6, on the other hand, has a different configuration although using all the same gears as in FIG. 5, essentially the same gear role assignment as that described in FIG. 4—with the large ring 61 fixed to device frame 61F as the reaction member.

Note that the examples of FIGS. 5 and 6 have a dimensional configuration of K:i:j=15:1:1 (75T×M2: (80T×M2−75T×M2):(80T×M2−60T×M2.5)=150 mm: 10 mm:10 mm=15:1:1).

In summary, a speed changing apparatus of the present invention outlined in FIG. 4 may have four different speed-changing setup configurations, as listed in Table 1. In Table 1, as well as 2 below, R, O and I in the Role row indicate, respectively, the reaction, the output and the input roles of the rotary elements of the inventive apparatus.

TABLE 1

| Element | Large Ring Gear 41 | Large Spur Gear 42 | Small Spur Gear 43 | Small Ring Gear 44 | Carrier Member 45E | Reduction Ratio |
|---|---|---|---|---|---|---|
| Configuration 1 | | | | | | |
| Role | R | — | — | O | I | |
| Motion | Fixed | Epicyclic | Epicyclic | Rotary | Rotary | |
| Speed | 0 | | | $ij/K(K+i-j)$ | 1 | $K(K+i-j)/ij$ |
| Configuration 2 | | | | | | |
| Role | O | — | — | R | I | |
| Motion | Rotary | Epicyclic | Epicyclic | Fixed | Rotary | |
| Speed | $-ij/(K-j)(K+i)$ | | | 0 | 1 | $-(K-j)(K+i)/ij$ |
| Configuration 3 | | | | | | |
| Role | — | R | O | — | I | |
| Motion | Epicyclic | Fixed | Rotary | Epicyclic | Rotary | |
| Speed | | 0 | $-ij/(K+i)(K-j)$ | | 1 | $-(K+i)(K-j)/ij$ |
| Configuration 4 | | | | | | |
| Role | — | O | R | — | I | |
| Motion | Epicyclic | Rotary | Fixed | Epicyclic | Rotary | |
| Speed | | $ij/K(K+i-j)$ | 0 | | 1 | $K(K+i-j)/ij$ |

As is comprehensible for those skilled in the art, the speed-reducing configurations in Table 1 can be easily changed into speed-increasing simply by swapping the I and O role assignment of each.

Figure 7:
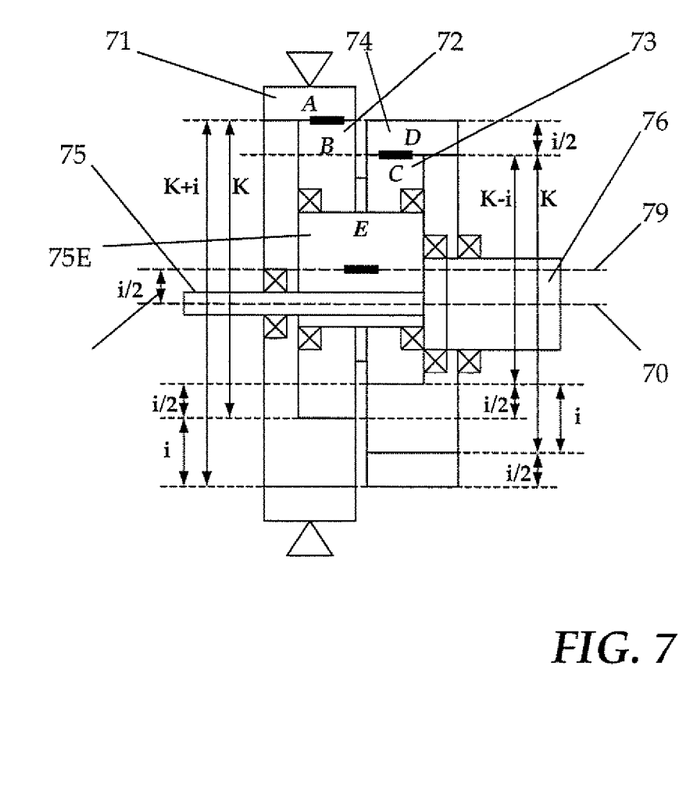
FIG. 7 schematically illustrates a cross-sectional view of a speed changing apparatus of the present invention with a dimensional configuration for optimized speed-changing application.

FIG. 7 schematically illustrates a cross-sectional view of a speed changing apparatus of the present invention that has a dimensional configuration optimized for speed-changing application in terms of weight and size, or power density. Under this special case, configurations in Table 1 become that listed in Table 2.

TABLE 2

| Element | Large Ring Gear 71 | Large Spur Gear 72 | Small Spur Gear 73 | Small Ring Gear 74 | Carrier Member 75E | Reduction Ratio |
|---|---|---|---|---|---|---|
| Configuration 1 | | | | | | |
| Role | R | — | — | O | I | |
| Motion | Fixed | Epicyclic | Epicyclic | Rotary | Rotary | |
| Speed | 0 | | | $i^2/K^2$ | 1 | $K^2/i^2$ |
| Configuration 2 | | | | | | |
| Role | O | — | — | R | I | |
| Motion | Rotary | Epicyclic | Epicyclic | Fixed | Rotary | |
| Speed | $-i^2/(K^2-i^2)$ | | | 0 | 1 | $1-K^2/i^2$ |
| Configuration 3 | | | | | | |
| Role | — | R | O | — | I | |
| Motion | Epicyclic | Fixed | Rotary | Epicyclic | Rotary | |
| Speed | | 0 | $-i^2/(K^2-i^2)$ | | 1 | $1-K^2/i^2$ |
| Configuration 4 | | | | | | |
| Role | — | O | R | — | I | |
| Motion | Epicyclic | Rotary | Fixed | Epicyclic | Rotary | |
| Speed | | $i^2/K^2$ | 0 | | 1 | $K^2/i^2$ |

Speed reduction ratios listed in the two tables show that with gears having tooth numbers centered at a value of K (with i and j values reduced to 1), a speed reducer of a ratio of $K^2$ can be constructed. This compares to the conventional cycloidal drive's reduction ratio of K.

Note, as is comprehensible, that a spur gear meshed inside a ring gear usually must have a tooth number sufficiently smaller than that of the ring. For example, with the popular 20-degree pressure angle gears, a minimum of 8-tooth difference is necessary. One typical approach to avoid gear interference for small tooth number difference is to employ profile shifting for the gears. Alternatively, with larger gear pressure angle, smaller tooth number difference is possible.

Also, since the epicyclic elements of one coaxial pair of the speed-changing apparatus of the present invention is normally so large in size relative to the other coaxial pair that only one pair is possible. A counterweight is therefore necessary in practical implementations of this inventive speed-changing apparatus, as is schematically illustrated as counterweight 65W in the embodiment depicted in FIG. 6. The counterweight is used to balance the mass of the epicyclic coaxial pair of gears opposite across the center axis of the apparatus.

While the above is a full description of the specific embodiments, various modifications, alternative constructions and equivalents may be used. For example, although geared implementations of the speed changing apparatus of the present invention are described as preferred embodiments, traction versions as well as strain wave gearing versions are equally applicable. Therefore, the above description and illustrations should not be taken as limiting the scope of the present invention.

That which is claimed:

1. A speed changing apparatus for changing an input speed at an input shaft to an output speed at an output shaft, the apparatus comprising:
   a coaxial pair of ring gears including a large ring gear having a pitch diameter A and a small ring gear having a pitch diameter D;
   a coaxial pair of spur gears including a large spur gear having a pitch diameter B and a small spur gear having a pitch diameter C;
   the large spur gear meshing with the large ring gear and the small spur gear meshing with the small ring gear, forming two meshing pairs; and
   a carrier member connected to one of the input and output shafts of the apparatus;
   wherein
   the pair of gears of one of the two coaxial pairs being fixed together to operate epicyclically on the carrier member;
   one gear of the other of the two coaxial pairs being fixed to a frame of the apparatus and the other gear of the other of the two coaxial pairs being connected to the other of the input and output shafts that is not connected to the carrier member; and
   the pairs of ring and spur gears satisfying the dimensional relationship of A=K+i, B=K, C=K−j and D=K+i−j, wherein K, i, and j are constants.

2. The apparatus of claim 1 wherein both and j are smaller than 5.

3. The apparatus of claim 1 wherein K/i is smaller than 30/1 or K/j is smaller than 30/1.

4. The apparatus of claim 1 wherein i equals j.

5. The apparatus of claim 1 wherein the one of the input and output shafts the carrier member connected to is the input shaft.

6. The apparatus of claim 1 wherein the one of the input and output shafts the carrier member connected to is the output shaft.

7. A speed changing apparatus for changing an input speed at an input shaft to an output speed at an output shaft, the apparatus comprising:
   a coaxial pair of ring gears including a large ring gear having a pitch diameter A and a small ring gear having a pitch diameter D;
   a coaxial pair of spur gears including a large spur gear having a pitch diameter B and a small spur gear having a pitch diameter C;
   the large spur gear meshing with the large ring gear and the small spur gear meshing with the small ring gear, forming two meshing pairs; and
   a carrier member connected to the input shaft of the apparatus;
   wherein
   the pair of gears of one of the two coaxial pairs being fixed together to operate epicyclically on the carrier member;
   one gear of the other of the two coaxial pairs being fixed to a frame of the apparatus and the other gear of the other of the two coaxial pairs being connected to the output shaft that is not connected to the carrier member; and
   the pairs of ring and spur gears satisfying the dimensional relationship of A=K+i, B=K, C=K−j and D=K+i−j, wherein K, i, and j are constants.

8. The apparatus of claim 7 wherein both i and j are smaller than 5.

9. The apparatus of claim 7 wherein K/i is smaller than 30/1 or K/j is smaller than 30/1.

10. The apparatus of claim 7 wherein i equals j.

11. The apparatus of claim 7 wherein the coaxial pair of gears with the two gears thereof fixed together and operates epicyclically on the carrier is the coaxial pair of spur gears.

12. The apparatus of claim 7 wherein the coaxial pair of gears with the two gears thereof fixed together and operates epicyclically on the carrier is the coaxial pair of ring gears.

13. A speed changing apparatus for changing an input speed at an input shaft to an output speed at an output shaft, the apparatus comprising:
   a coaxial pair of ring gears including a large ring gear having a pitch diameter A and a small ring gear having a pitch diameter D;
   a coaxial pair of spur gears including a large spur gear having a pitch diameter B and a small spur gear having a pitch diameter C; the large spur gear meshing with the large ring gear and the small spur gear meshing with the small ring gear, forming two meshing pairs; and
   a carrier member connected to the output shaft of the apparatus; wherein
   the pair of gears of one of the two coaxial pairs being fixed together to operate epicyclically on the carrier member;
   one gear of the other of the two coaxial pairs being fixed to a frame of the apparatus and the other gear of the other of the two coaxial pairs being connected to the input shaft that is not connected to the carrier member; and
   the pairs of ring and spur gears satisfying the dimensional relationship of A=K+i, B=K, C=K−j and D=K+i−j, wherein K, i, and j are constants.

14. A speed changing apparatus for changing an input speed at an input shaft to an output speed at an output shaft, the apparatus comprising:
   a coaxial pair of ring members including a large ring member having a pitch diameter A and a small ring member having a pitch diameter D;
   a coaxial pair of disc members including a large disc member having a pitch diameter B and a small disc member having a pitch diameter C; the large disc member traction engaging with the large ring member and the small disc traction engaging with the small ring member, forming two engaging pairs; and
   a carrier member connected to one of the input and output shafts of the apparatus;
   wherein
   the pair of members of one of the two coaxial pairs being fixed together to operate epicyclically on the carrier;
   one member of the other of the two coaxial pairs being fixed to a frame of the apparatus and the other member of the other of the two coaxial pairs being connected to the other of the input and output shafts that is not connected to the carrier member; and
   the pairs of ring and disc members satisfying the dimensional relationship of A=K+i, B=K, C=K−j and D=K+i−j, wherein K, i, and j are constants.

15. A speed changing apparatus for changing an input speed at an input shaft to an output speed at an output shaft, the apparatus comprising:

a coaxial pair of internal engagement members including a large internal engagement member having an engagement pitch diameter A and a small internal engagement member having an engagement pitch diameter D;

a coaxial pair of external engagement members including a large external engagement member having an engagement pitch diameter B and a small external engagement member having an engagement pitch diameter C; the large external engagement member engaging with the large internal engagement member and the small external engagement member engaging with the small internal engagement member, forming two engaging pairs; and a carrier member connected to one of the input and output shafts of the apparatus;

wherein the pair of members of one of the two coaxial pairs being fixed together to operate epicyclically on the carrier member;

one member of the other of the two coaxial pairs being fixed to a frame of the apparatus and the other member of the other of the two coaxial pairs being connected to the other of the input and output shafts that is not connected to the carrier member; and the pairs of internal and external engagement members satisfying the dimensional relationship of $A=K+i$, $B=K$, $C=K-j$ and $D=K+i-j$, wherein K, i, and j are constants.

16. The apparatus of claim 15 wherein the coaxial pair of internal engagement members are ring gear members; and wherein the coaxial pair of external engagement are strain wave gearing members.

17. The apparatus of claim 15 wherein the coaxial pair of internal engagement members are strain wave gearing; and wherein the coaxial pair of external engagement are spur gear members.

\* \* \* \* \*